United States Patent
Rollins (10) Patent No.: US 7,912,376 B2
(45) Date of Patent: Mar. 22, 2011

(54) NON-INTERFERING TRANSMITTED-BEAM PAIRS

(75) Inventor: George E. Rollins, Chelmsford, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 758 days.

(21) Appl. No.: 11/864,594

(22) Filed: Sep. 28, 2007

(65) Prior Publication Data

US 2009/0087189 A1    Apr. 2, 2009

(51) Int. Cl.
*H04B 10/00* (2006.01)

(52) U.S. Cl. ........ 398/140; 398/118; 398/119; 398/130; 398/151; 398/158; 398/183; 398/189; 398/191

(58) Field of Classification Search .................. 398/118, 398/119, 128–131, 140, 151, 158, 159, 164, 398/189, 191; 370/212
See application file for complete search history.

(56) References Cited

U.S. PATENT DOCUMENTS

| | | | | |
|---|---|---|---|---|
| 2,425,066 A | * | 8/1947 | Labin et al. | 370/212 |
| 2,477,625 A | * | 8/1949 | Labin | 348/484 |
| 6,141,357 A | * | 10/2000 | Testani et al. | 370/507 |
| 7,352,972 B2 | * | 4/2008 | Franklin | 398/172 |

* cited by examiner

*Primary Examiner* — Li Liu
(74) *Attorney, Agent, or Firm* — Schwegman Lundberg & Woessner, P.A.; William R. Walbrun; John M. Miller (57) ABSTRACT

Embodiments include apparatus, methods, and system including an apparatus comprising a photo receiver operable to detect a stream of light pulses transmitted from a photo transmitter paired with the photo receiver, wherein a frequency of the stream of light pulses has a harmonic relationship with a frequency of at least one other stream of light pulses transmitted by a photo transmitter not paired to the photo receiver, wherein the stream of light pulses from the transmitter paired with the photo receiver is detectable by the photo receiver even when the photo receiver is receiving one or more light pulses from the at least one other stream of light pulses.

22 Claims, 7 Drawing Sheets

NON-INTERFERING TRANSMITTED-BEAM PAIRS

FIELD OF THE INVENTION

The present invention relates generally to photoelectric sensors.

BACKGROUND

A photoelectric sensor is a device or devices used to detect the presence of an object by using a light transmitter and a photoelectric receiver. Photoelectric sensing uses a beam of light transmitted from the light transmitter, and the presence or absence of the transmitted light arriving at the photoelectric receiver, to detect the presence or absence of an object. This technology is an alternative to other types of sensing, such as limit switches and inductive proximity sensors. Photoelectric sensing may be employed when the required sensing distances are longer, or when the item to be sensed is non-metal.

Generally, photoelectric sensors include one of three functional types. An opposed arrangement consists of a receiver located within the line-of-sight of the transmitter. In this type, light is transmitted by the transmitter directed toward the receiver, and an object is detected when the light is blocked from getting to the receiver. A retro-reflective arrangement places the transmitter and receiver at the same approximate location, and uses a reflector to bounce the light beam back from the transmitter to the receiver. An object is sensed when the light beam is interrupted and fails to reach the receiver. A proximity-sensing arrangement is one in which the transmitted radiation must reflect off of the object in order to reach the receiver. In this type, an object is detected when the receiver sees the light from the transmitter rather than when the receiver fails to see the light from the transmitter.

SUMMARY

The apparatus, methods, and systems of the various embodiments of the present invention and will be understood by reading and studying the following specification.

Embodiments include an apparatus comprising a photo receiver operable to detect a stream of light pulses transmitted from a photo transmitter paired with the photo receiver, wherein a frequency of the stream of light pulses has a harmonic relationship with a frequency of at least one other stream of light pulses transmitted by a photo transmitter not paired to the photo receiver, wherein the stream of light pulses from the transmitter paired with the photo receiver is detectable by the photo receiver even when the photo receiver is receiving one or more light pulses from the at least one other stream of light pulses.

Embodiments include a method comprising receiving one or more streams of transmitted light pulses, wherein each of the one or more streams of transmitted light pulses has a harmonic relationship with each of the other one or more streams of transmitted light pulses, determining a pulse width for each pulse of light received in the one or more streams of transmitted light pulses, determining if the pulse width is a qualified pulse width, and determining if a particular stream of transmitted light pulses is included in any one of the one or more streams of transmitted light pulses based on a number of consecutively received pulses that are qualified pulses.

Embodiments include a system comprising a plurality of photoelectric sensors, each of the plurality of photoelectric sensors, including a non-interfering transmitted beam pair including a transmitter and a receiver, wherein each of the transmitted beam pairs is operable to transmits a stream of light pulses having a pulse width that is different from any pulse width of any other transmitted beam pair and each transmitted stream of light pulses having a harmonic relationship to every other transmitted stream of light pulses, wherein the transmitter and the receiver within a given transmitted beam pair is not connected by a synchronizing interconnect between the transmitter and the receiver, and wherein each of the transmitted beam pairs is operable to determine if a stream of light pulses received at the receiver of the transmitted beam pair includes a light stream of light pulses being transmitted from the corresponding transmitter paired with the receiver.

Embodiments include a system comprising a first photo receiver paired with a first photo transmitter, the first photo transmitter operable to transmit pulses of light having a first frequency and including pulses having a first width, a second photo receiver paired with a second transmitter, the second transmitter operable to transmit pulses of light having a second frequency and including pulses having a second width, a third photo receiver paired with a third transmitter, the third transmitter operable to transmit pulses of light having a third frequency and including pulses having a third width, wherein the first, second and third frequency are each different frequencies from one and other, and the first, second, and third widths are different widths from one and other, wherein each of the first frequency, the second frequency, and the third frequency are harmonically related to each other, and wherein each of the first photo receiver, the second photo receiver, and the third photo receiver include a decision module operable to determine that a stream of light pulses received at the first photo receiver was transmitted from the first photo transmitter.

These and other aspects, embodiments, advantages, and features will become apparent from the following description and the referenced drawings.

DETAILED DESCRIPTION

In the following detailed description of the inventive subject matter, reference is made to the accompanying drawings which form a part hereof, and in which are shown by way of illustration, specific embodiments in which the invention may be practiced. These embodiments are described in sufficient detail to enable those skilled in the art to practice the present invention. Other embodiments may be utilized and structural, logical, and electrical changes may be made without departing from the scope of the invention. The various embodiments disclosed herein are not necessarily mutually exclusive, as some embodiments can be combined with one or more other embodiments to form new embodiments. The following detailed description is, therefore, not to be taken in a limiting sense.

Embodiments described herein include non-interfering transmitted beam pairs of photoelectric sensors. Each of the non-interfering beam pairs is operable to detect the presence or absence of objects based on whether the light from a transmitter of the pair is being received by a photo receiver paired to the transmitter. The non-interfering transmitted beam pairs are considered "non-interfering" because each of the non-interfering transmitted beam pairs are operable to each transmit a stream of light pulses having a same wavelength or a same range of wavelengths of light that may be received by any of the revivers without interfering with one and other. This non-interference is maintained even in the event one or more streams of light pulses transmitted from a transmitter not paired to a given receiver reach the given receiver. In addition, for the embodiments of the present subject matter, no synchronization and no synchronizing interconnections are required between a transmitter and its corresponding receive in order for the paired receiver to discern between the stream of light pulses transmitted from the transmitter paired with the receiver and any other stream or streams of light pulses transmitted from a transmitter or transmitters not paired with the receiver.

Embodiments described herein are referred to as transmitted beam pairs because the transmitter transmits a beam of light through a transmission channel to a receiver that is paired to the transmitter. In various embodiments, each receiver is operable to detect the stream of light pulses being provided by the transmitter to which it is paired, while disregarding any other light pulses received from another transmitter included in a set of transmitted beam pairs. This allows the transmitter beam pair to operate in the same vicinity as other transmitter and receiver pairs in the set of transmitted beam pairs in order to properly detect the presence or absence of objects intended to be detected by the transmitter beam pair without interfering with one or more of the other transmitted beam pairs. The embodiments of the present subject matter are operable as described herein without having to use synchronization, and without the need for a synchronization interconnection between the transmitters and the receivers of any of the transmitted beam pairs.

In various embodiments, the transmitted beam pairs within a set of transmitted beam pairs employ streams of light pulses having a harmonic relationships with one and other. The harmonic relationships provided cycles for the streams of light pulses being generated by the transmitters of the set of transmitted beam pairs. Wherein each of the cycles there are periods of the cycle where there are no interferences, and thus no corruption of the pulses from a given transmitter due to light beam pulses from any other transmitter in the set of transmitted beam pairs. Within each of the cycles, there are also periods where the light pulses from a given transmitter may be interfered with by light pulses from another transmitter in the set. However, due to the harmonic relationships, only a maximum number of pulses in a row from a given transmitter are capable of being corrupted by light pulses of another transmitter in the set.

Therefore, by determining that at least a pre-determined number of consecutively qualified pulses are detected, and by determining that at least a pre-determined number of consecutive time periods have expired without detecting of a qualified pulse, wherein the pre-determined number exceeds the maximum number of possible consecutive corrupted light pulses for a given receiver, the given receiver is operable to ignore any corrupted light pulses that may occur. By ignoring any corrupted light pulses, the given receiver is operable to properly determine its output setting relative to receiving or not receiving the stream of light pulses from the transmitter paired to the given receiver.

In various embodiments, the harmonic relationship between the frequencies of the streams of light pulses generated by any given two transmitters in a set of non-interfering transmitted beam pairs within a set and the pre-determined value used by the receiver to properly ignore the periods of corruption within the harmonic cycles of the streams of light pulses is defined for any given two non-interfering transmitter/receiver pairs as:

$$f_{clock}A/|(f_{clock}A-f_{clock}B)|>X \qquad \text{[Equation 1]}$$

and $$f_{clock}B/|(f_{clock}B-f_{clock}A)|>X \qquad \text{[Equation 2]}$$

wherein $f_{clock}A$ is the frequency of the streams of light pulses provided by a transmitter A, $f_{clock}B$ is the frequency of the streams of light pulses provided by a transmitter B, and X is the number of bits in a shift register that determine the pre-determined value including any integer values greater than 1. For Equation 1, the harmonic relationship between the frequency of the stream of light pulses from transmitter A and transmitter B, as defined by the frequency of transmitter A's clock divided by the absolute value of the difference between the frequency of transmitter A's clock and transmitter B's clock must be greater than X.

A similar relationship for the frequency of transmitter B's clock as defined by Equation 2, must also result in a value greater than X. If these relationships are true, then there is a harmonic relationship between the steams of light pulses such that for any pre-determined values of X, wherein X is an integer greater than one can be used to properly discriminate between the streams of light pulses transmitted by transmitter A and B. This is true despite any corruption of the light pulses that may occur during the cycles of light pulses generated by these transmitters.

In instances where three pairs of transmitters/receivers are included in a set of non-interfering transmitted beam pairs, in addition to Equation 1 and Equation 2, the set will function as non-interfering transmitted beam pairs if the following additional equation are also true:

For transmitter A and a third transmitter C:

$$f_{clock}A/|(f_{clock}A-f_{clock}C)|>X \qquad \text{[Equation 3]}$$

and $$f_{clock}C/|(f_{clock}C-f_{clock}A)|>X \qquad \text{[Equation 4]}$$

wherein $f_{clock}C$ is the frequency of the streams of light pulses provided by the transmitter C;

and for transmitter B and the third transmitter C:

$$f_{clock}B/|(f_{clock}B-f_{clock}C)|>X \qquad \text{[Equation 5]}$$

and $$f_{clock}C/|(f_{clock}C-f_{clock}B)|>X \qquad \text{[Equation 6]}.$$

For a three pair set of transmitters and receivers, if all of Equations 1-6 are true, the three pairs of transmitters and receivers are operable to provide a set of non-interfering transmitted beam pairs. It would be understood that is possible to extend this technique to additional pairs of transmitters and receivers to be included in a set.

Figure 1:
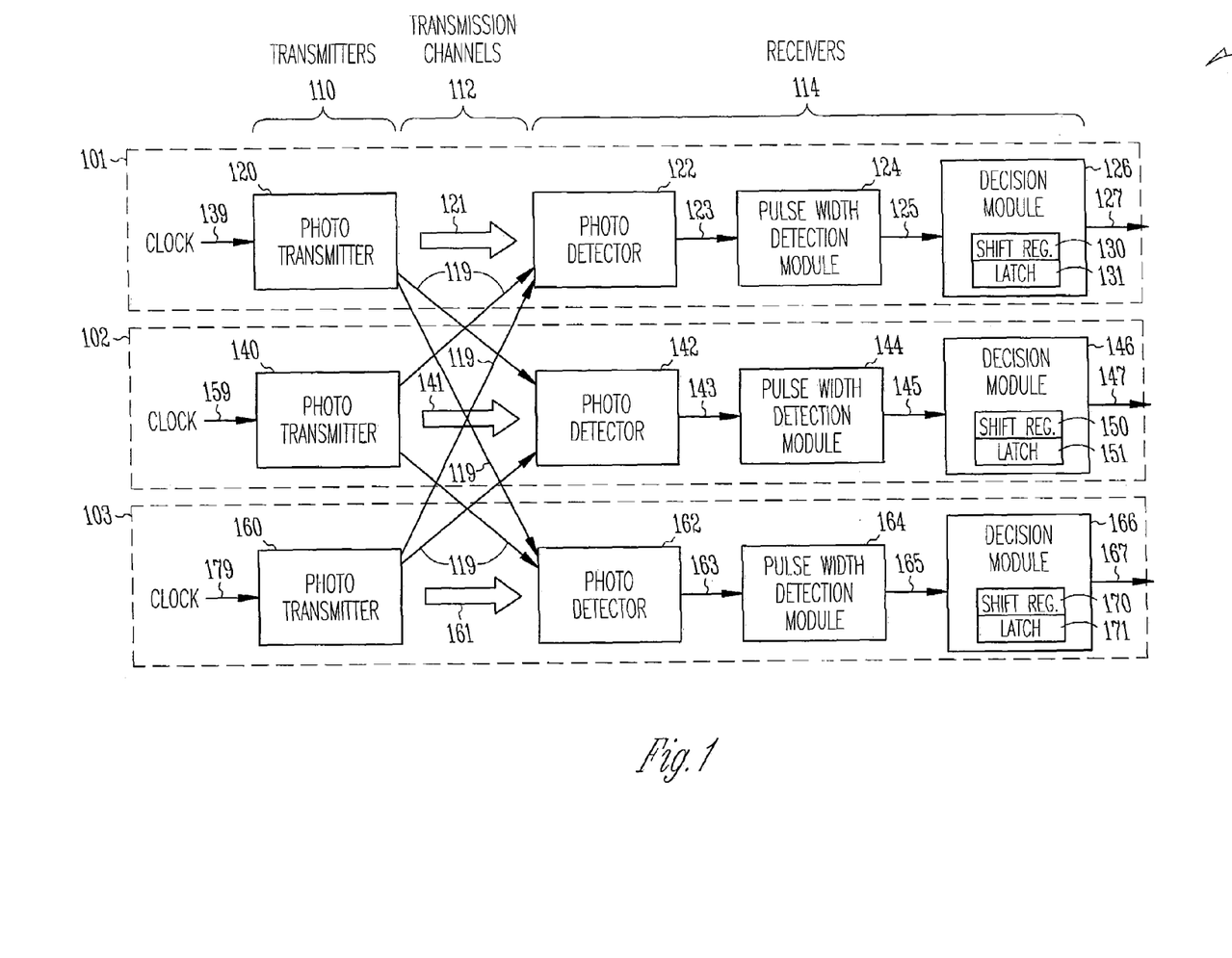
FIG. 1 illustrates a functional block diagram of a plurality of non-interfering transmitted beam pairs according to various embodiments.

FIG. 1 illustrates a functional block diagram 100 of non-interfering transmitted beam pairs 101, 102, 103, referred to as "pair" or "pairs" 101, 102, and 103. In various embodiments, pairs 101, 102, and 103 are a set of non-interfering transmitted beam pairs. Each of the pairs 101, 102, and 103 includes a photoelectric sensors including a photo-transmitter and a photo-receiver that are paired to form the particular non-interfering transmitted beam pairs 101, 102, or 103. Transmitters 110 represent the photo-transmitters for the pairs 101, 102, and 103, wherein pair 101 includes photo-transmitter 120, pair 102 includes photo-transmitter 140, and pair 103 includes photo-transmitter 160. Receivers 114 include receiver blocks including a photo detector module, a pulse width detection module, and a decision module. The receiver portion of pair 101 includes photo detector module 122, pulse width detection module 124, and decision module 126. The receiver portion of pair 102 includes photo detector module 142, pulse width detection module 144, and decision module 146. The receiver portion of pair 103 includes photo detector 162, pulse width detection module 164, and decision module 166.

Each of the photo transmitters 120, 140, and 160 are operable to transmit a stream of light pulses over transmission channel 112. Transmission channel 112 is not limited to any particular transmission channel. In various embodiments, transmission channel 112 is any space between a photo-transmitter and a receiver portion of pairs 101, 102, and 103. In various embodiments, transmission channel 112 is ambient air surrounding pairs 101, 102, and 103.

The transmitted stream of light pulses transmitted by transmitter 120 of pair 101 is represented by arrow 121. The transmitted stream of light pulses transmitted by transmitter 140 of pair 102 is represented by arrow 141. The transmitted stream of light pulses transmitted by transmitter 160 of pair 103 is represented by arrow 161.

Generally, each photo-transmitter and corresponding receiver of a particular one of pairs 101, 102, and 103 are aligned so that the transmitted beam of light including the stream of light pulses from the photo transmitter is directed to the corresponding reviver, and are not necessary directed to a receiver of a differ one of the pairs 101, 102, and 103. However, it is possible for errant streams of light pulses or individual errant light pulses, represented by arrows 119, to be received at any of the receivers included in pairs 101, 102, 103. These errant streams of light pulses and errant light pulses are transmitted for a transmitter that is not the particular transmitter paired with the receiver receiving the errant streams of light pulses or the errant light pulses.

By way of illustration, photo detector 122 is intended to receive streams of light pulses from photo-transmitter 120, but may also receive errant streams of light pulses 119 from photo-transmitter 140 or photo transmitter 160, or both. In another illustration, photo detector 142 is intended to receive streams of light pulses from photo-transmitter 140, but may also receive errant streams of light pulses 119 from photo-transmitter 120, or photo-transmitter 160, or both. In a further illustration, photo detector 162 is intended to receive streams of light pulses from photo-transmitter 160, but may also receive errant streams of light pulses 119 from photo-transmitter 120, or photo-transmitter 140, or both.

In various embodiments, each of pairs 101, 102, and 103 includes an output 127, 147, and 167 respectively. Each of outputs 127, 147, and 167 is operable to provide an output signal indicative of a status for the associated pairs 101, 102, and 103 indicative of whether or not the stream of light pulses from the corresponding transmitter is being received at the photo detector associated with the given output. The status of the output properly indicates this status even when the photo detector is receiving errant streams of light pulses from either of the photo transmitters not associated with the photo detector that is receive the streams of light pulses and is providing the status as an output.

Errant stream of light pulses can occur when pairs of photoelectric sensors operate using a same or an overlapping range of wavelengths of light in their transmissions and are used in a space where the various occurrences, such as misalignments between photo transmitters and photo detectors, reflections of the transmitted streams of light pulses, and the use of high intensities or broad beam patterns and shapes over the transmission channel occur. In photoelectric sensors that to not include the non-interfering features of the present inventive subject matter, errant streams of light pulses can create incorrect indications from a photoelectric sensor. For example, errant streams of light and errant light pulses received at a photo detector can cause the receiver having the photo detector to indicate a positive reception of light from the transmitter paired to the receiver when the actual stream of light pulses from the transmitted paired with the receiver is blocked. This situation results in an incorrect output from the receiver regarding whether or not an object is present between the transmitter and the receiver of a pair.

Previous attempts to overcome these problems related to errant streams of light pulses included synchronizing photoelectric sensors by having the transmitter and receiver portion in a same unit, such as a reflective type photoelectrical sensor. For photoelectric sensors where the transmitter and receiver portion are in separate units, such as in some thru-beam type photoelectric sensors, or in transmitted beam types, synchronization is not incorporated, which leads to the incorrect indications discussed, or synchronization requires a synchronization interconnection to be connected between the transmitter and the receiver units. However, the interconnect adds cost to both the units themselves and to the costs involved in installation of the units. In addition, when a synchronization interconnection is used, if the interconnection fails, for instance if the interconnect is cut, crushed, or otherwise disturbed, the photoelectric sensor will fail to operate properly.

Other previous attempts to overcome the problems of errant light pulses included using bursts of pluralities of closely spaced pulses followed by periods where no pulses are transmitted. These systems include asynchronous, period-discriminate type photoelectric sensors. However, these type sensors are susceptible to corruption when errant light pulses from one transmitter not paired to a receiver reach the receiver.

The pairs 101, 102, 103 as illustrated in FIG. 1 are operable to allow proper indiction of reception or of no reception of light pulses between a paired photo transmitter and photo. This proper indication of reception is maintained despite errant light pulses being received at the receiver within a given pair. This is accomplished without the need for synchronization, and without the need for a synchronization interconnection between the transmitter and the receiver of the pair. Further, no interconnections between the different pairs is required. Each pair of photo transmitters and receivers in pairs 101, 102, and 103 operate asynchronously with respect to the transmitter and the receiver within a pair, asynchronously from one pair to another pair, and without the need for any interconnect between the pairs 101, 102, and 103.

By setting the pulse widths and the periods of the streams of light pulses transmitted from each of the transmitters 120, 140, and 160 as described herein, receivers 114 of each of pairs 101, 102, and 103 are operable to detect the presence or absence the streams of light pulses provided by their corresponding transmitter, and to disregard any errant light pulses reaching the receivers. Thus, each of pairs 101, 102, and 103 are operable to properly provide an output signal indicate of the status the reception or non-reception of their intended stream of light pulses while disregarding any errant light pulses from other transmitters of the pairs 101, 102, and 103.

In operation, and using pair 101 for illustration purposes, photo transmitter 120 transmits a stream of light pulses 121 having a known pulse width and a known period. Assuming the transmitted stream of light pulses 121 is not being blocked by an object to be sensed by the pair 101, the stream of light pulses 121 is received at the photo detector 122 and the light pulses are detected. Photo detector 122 provides an output signal representative of the detected light pulses to pulse width detection module 124. Pulse width detection module 124 processes each of the detected pulses to determine a pulse width for each pulse. Based on the pulse width and the known timing for the period of the stream of light pulse 121, pulse width detection module is operable to provide an output signal indicative of whether a qualified pulse was received in the stream of light pulses within a given internal of time. The output signals from pulse width detection module 124 are provided as inputs to decision module 126. Pulse width detection module 124 is operable to disregard as non-qualified pulses any light pulses provided from photo detector 122 that do not have the known pulse width for the light pulses included in the stream of light pulses 121.

The outputs from pulse width detection module 124 are stored in decision module 126. In various embodiments, the outputs are stored in shift register 130. In various embodiments, the output from pulse width detection module 124 is used to increment or to clear some type of counter or other storage device operable to store and count the outputs from pulse width decision module 124. Decision module 126 is operable to determine, based on the values stored in shift register 130 (or in the other counters or storage device of decision module 126) whether to latch the output 127 to a status indicative of receiving a stream of light pulses 121. In various embodiments, this determination is made when a pre-determined number of consecutively qualified pulses has been detected by the receiver of pair 101, wherein the number of consecutively qualified pulses is available to decision module 126, and is compared to the value representing the pre-determined number of consecutively qualified pluses needed before the output is latched.

If a determine is made to latch the output 127, latch 131 is operable to latch output 127 in the state indicating that a stream of light pulses 121 is being received. Decision module 126 is further operable to keep output latched in that state until decision module 126 determines that the stream of light pulses 121 is no longer being received at photo detector 122. In various embodiments, this determination is made, and output 127 is unlatched, only after a pre-determine number time periods have occurred without the detection of any qualifying light pulses.

Figure 2:
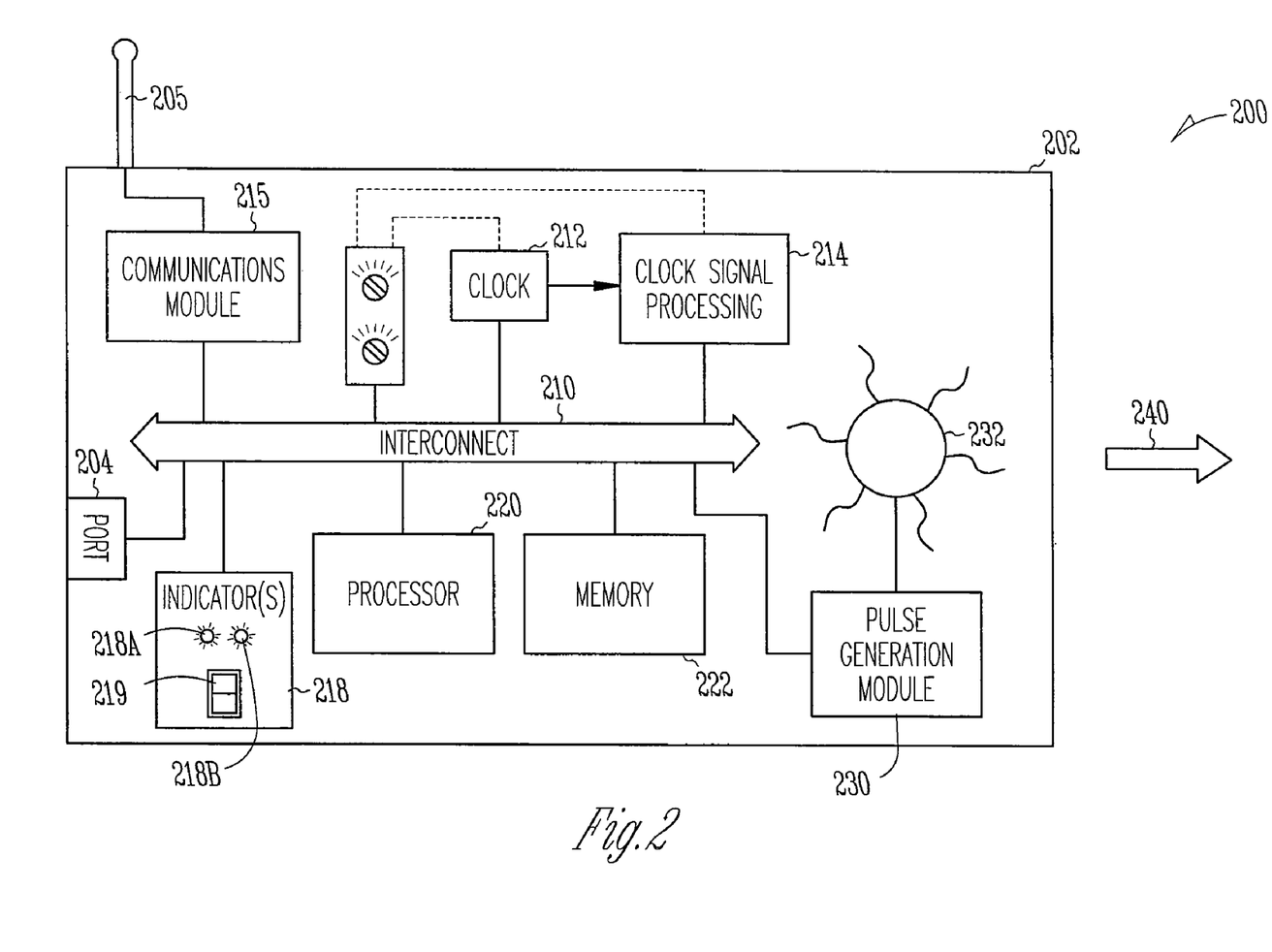
FIG. 2 illustrates a function block diagram of a transmitter for transmitting a stream of light pulses according to various embodiments.

FIG. 2 illustrates a functional block diagram of a transmitter 200 for transmitting a stream of light pulses. In various embodiments, transmitter 200 includes a housing 202 including any combination of the devices illustrated as part of transmitter 200.

In various embodiments, transmitter 200 includes an interconnect 210 coupling any combination of one or more of the devices included in transmitter 200. Interconnect 210 is not limited to any particular type or types of interconnects, and includes any type or types of interconnect operable to communicatively and electrically couple the devices included in transmitter 200. In various embodiments, transmitter 200 includes a pulse generation module 230 coupled to a light source 232. In various embodiments, light source 232 is operable to provide a stream of pulses of light, represented by arrow 240, to be transmitted over a transmissions channel to a receiver (not shown in FIG. 2) paired with the transmitter 200. Light source 232 is not limited to any particular type of light source. In various embodiments, light source 232 is a light emitting diode (LED). Light source 232 is not limited to providing pulses of light that include light having a particular wavelength or a particular range of wavelengths. In various embodiments, light source 232 produces light have a wavelength or a range of wavelengths in the range of wavelengths associated with visible light. In various embodiments, light source 232 provides light having a wavelength or having a range of wavelengths associated with infrared light.

In various embodiments, pulse generation module 230 is operable to control light source 232 in order to have light source provide a stream of light pulses having a pulse width, a duty cycle, and a period designed for the transmitter. In various embodiments, transmitter 200 includes a clock 212 operable to provide a clock signal used to generate one or more aspects of the timing for the pulses of light transmitted by transmitter 200. In various embodiments, transmitter 200 includes a clock signal processing module 214 coupled to the clock 212 and operable to process a clock signal provided by clock 212 for generating the time of the period of the stream of light pulses provided by light source 232. In various embodiments, clock signal processing module 214 includes one or more dividers operable to divide down the frequency of the clock signal in order to produce a signal having a period corresponding to the period designated for the stream of light pulses to be generated by transmitter 200. In various embodiments, the divider includes a digital counter, such as a 74HC4020 chip having a combination of one or more of the counter outputs coupled to logic gates to provide an output having a period designated for the stream of light pulse to be generated by transmitter 200

In various embodiments, clock signal processing module 214 is operable to adjust the duty cycle of the signal used in the generation of the stream of light pulses. In various embodiments, the clock signal processing module 214 includes a resistor-capacitor RC timing circuit operable to provide the desired duty cycle for the stream of light pulses to be transmitted from transmitter 200. In various embodiments, clock signal processing module 214 adjusts the pulse width so that the duty cycle of the signal provided by the clock signal processing module 214 to be between 1 and 3 percent, wherein the duty cycle represents the percentage of time when light is provided as compared to the total period for a single pulse within the stream of light pulses transmitted from transmitter 200. However, the duty cycle is not limited to any particular duty cycle. In various embodiments, the output signal from the clock signal processing module 214 is coupled to the pulse generation module 230 and is used to control the period and duty cycle of the stream of light pulses produced by light source 232.

In various embodiments, the pulse width, the period, and duty cycle of the signals controlling the generation of the stream of light pulses are programmable. By way of illustration, in some embodiments, transmitter 200 includes a processor 220 coupled to a memory. In various embodiments, processor 220 and memory 222 are coupled to interconnect 210. In various embodiments, parameters for the period for the stream of light pulses, or the pulse width of the stream of light pulse, or both, are stored in memory 222. In various embodiments, processor 222 is operable to read data from memory 222, and to control a signal that then controls the period of the stream of light pales, the pulse width of the stream of light pulses, or both that are to be generated by light source 232.

In various embodiments, one or more data sets related to the period, the pulse width, of both, for the stream of light pulses generated by transmitter 200 are programmed into memory 222 through a port 2024 included in transmitter 200 and stored into memory 222. In various embodiments, transmitter 200 includes one or more input devices 216 operable to allow input settings to be provided for transmitter 200. By way of illustration, in various embodiments one of input devices 216 is a selector switch operable to allow a selection of one of a plurality of sets of data to be selected relate to the period and pulse width for the stream of light pulses to be generated by light source 232.

In various embodiments, one or more of inputs devices 216 is coupled to clock 212, or is coupled to clock signal processing module 214, or both, and is operable to allow input settings to be communicated to the clock 212, or to the clock signal processing module 214, or both, the input settings operable to control the period, or the pulse width, or both, for the signals controlling the stream of light pulses generated by transmitter 200.

In various embodiments, transmitter 200 includes a communication module 215 coupled to an antenna 205 and operable to provide communication signals into and out of the transmitter 200. In various embodiments, communication module 215 and antenna 205 are operable to receive data including parameters for the period, or parameters for the pulse width, or both, for one or more sets of data related to the stream of light pulses generated by transmitter 200. In various embodiments, these data parameters are stored into memory 222 for later selection and use in controlling the signals used to generate the streams of light pulses transmitted from transmitter 200.

In various embodiments, one or more of input devices 216 is operable to provide inputs used to select a set of data parameters from sets of data parameters stored in memory 222, the selected set of data parameters used for control of the signals used in the generation of the streams of light pulses garneted by transmitter 200.

In various embodiments, transmitter 200 includes one or more output indicators 218. In various embodiments, output indictors 218 include one or more lights 218A-B that are operable to illuminate to indicate a status associated with transmitter 200. In various embodiments, output indicators 218 include a display 219 operable to display one or more symbols, numbers, letters, or other graphic representations. The state indicated by status indicators 218A-B is not limited to any particular indications. In various embodiments, one of output indicators 218A-B illuminates to indicate that transmitter 200 is powered. In various embodiments, one or more of output indicators 218 is operable to display a number of other indiction for the selection of the parameters for the period and the pulse width for the stream of light pulses the transmitter 200 is designated to generate whenever the light source 232 is producing streams of light pulses.

Figure 3A:
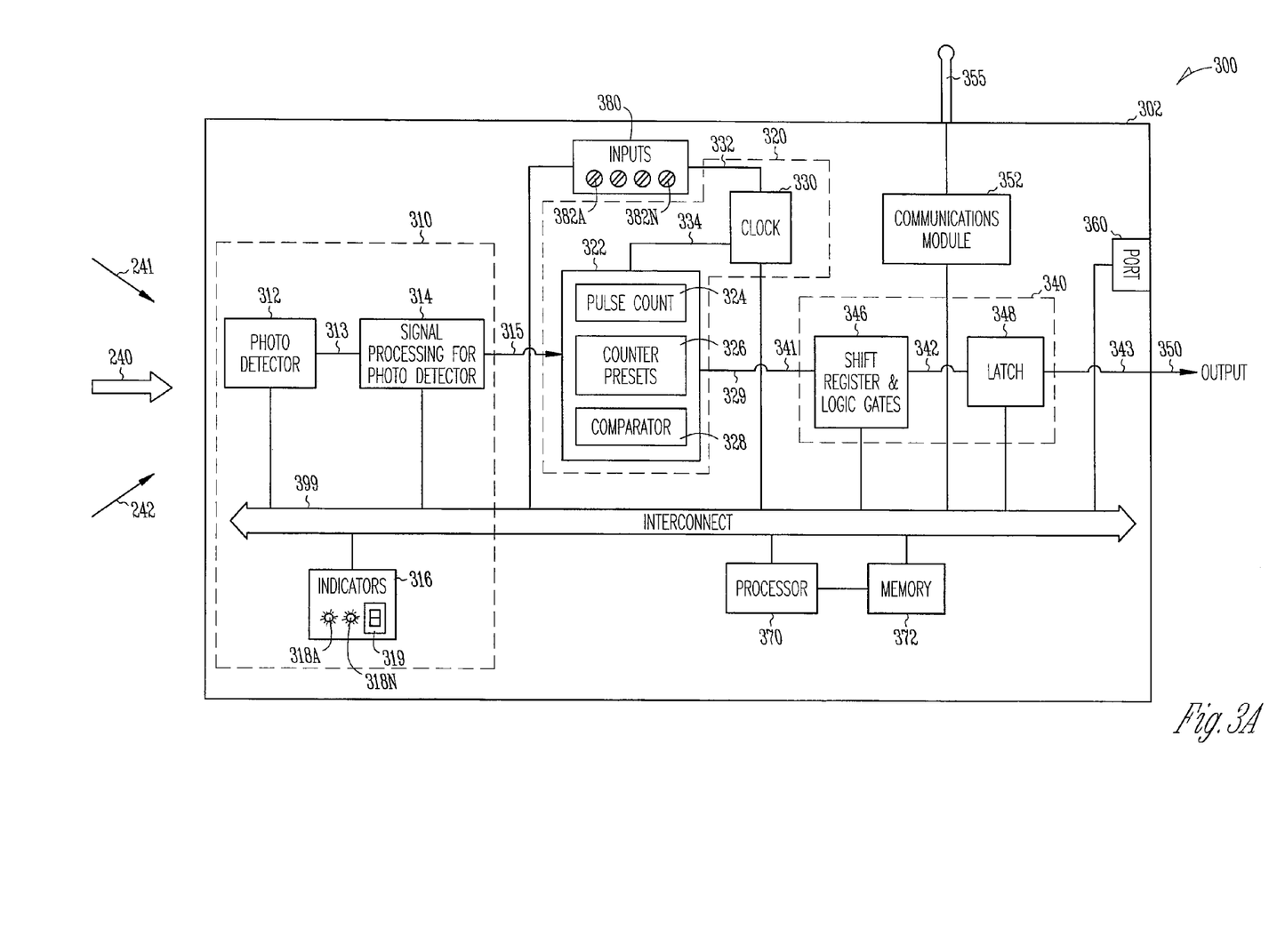
FIG. 3A illustrates a functional block diagram of a photo receiver according to various embodiments.

FIG. 3A illustrates a functional block diagram of a photo receiver 300 according to various embodiments of the present subject matter. Photo receiver 300 is not limited to any particular type of photo receiver, and includes any type of photo receiver operable to receive a stream of light pulses transmitted from a transmitter paired with the photo receiver 300. In various embodiments, any combination of devices shown in FIG. 3A are included in a housing 302. In various embodiments, photo receiver 300 is any one of the receivers 114 included in pairs 101, 102, or 103 in FIG. 1. In various embodiments, photo receiver 300 is operable to receive a stream of light pulses transmitted from a given one to the transmitters 110 in pairs 101, 102 and 103 to which photo receiver 300 is paired.

In various embodiments, photo receiver 300 includes an interconnect 399 coupling any combination of one or more of the devices included in photo receiver 300. Interconnect 399 is not limited to any particular type or types of interconnects, and includes any type or types of interconnect operable to communicatively and electrically couple the devices included in photo receiver 300.

In various embodiments, receiver 300 includes a photo detector portion 310, a pulse width detection module 320, and a decision module 340. Detector portion 310 is not limited to any particular type of detector portion, and includes any type of detector portion operable to detect the transmitted beam from a photo transmitter that the photo receiver 300 is paired with. In various embodiments, detector portion 310 is any one of photo detectors 122, 142, and 162 as shown in FIG. 1. Pulse width detection module 320 is not limited to any particular type of pulse width detection module, and in various embodiments is any one of pulse width detection modules 124, 144, and 164 as shown in FIG. 1. Decision module 320 is not limited to any particular type of decision module, and in various embodiments is any one of pulse width detection modules 126, 146, and 166 as shown in FIG. 1

Referring again to FIG. 3A, in various embodiments, detector portion 310 includes a photo detector 312 coupled to a signal processing module 314 through connection 313. Photo detector 312 is not limited to any particular type of photo detector, and includes any photo detector operable to sense the pulses of light within the wavelengths of light being transmitted by the photo transmitter to which the photo receiver 300 is paired, and to provide an output signal representative of the pulses of light received. Signal processing module 314 is not limited to any particular type of signal processing module, and includes any type of signal processing module operable to process the output signal from photo detector 312 and provide an output signal from the signal processing module at output 315 representative of the pulses of light sensed by photo detector 312.

In various embodiments, the output of signal processing module 314 is a digital signal, wherein an output value of "0" is provided from the signal process module 314 when no light is received at photo detector 312, and an output value of "1" is provided from the signal process module 314 when light is being received at photo detector 312. However, any type of output signal, including an analog signal having a varying voltage level, is contemplated by various embodiments as an output signal from signal process module 314.

In various embodiments, the output signal from signal processing module 314 is provided as an input to pulse width detection module 320. Pulse width detection module 320 is not limited to any particular type of pulse width detection module, and includes any type of pulse width detection module operable to receive the output signals from detector portion 310, and to determine a pulse width from the output signals for each detected light pulse as represented in the output signals from detector portion. In various embodiment, based on the determined pulse width, pulse width detection module 320 is operable to determine if the width for each of the pulses qualifies the pulse as a "qualified pulse" based on the known pulse width for pulses included in the streams of light being transmitted by the transmitted paired to the receiver 300. In various embodiments, pulse width detection module 320 is any one of pulse width detection modules 124, 144, and 164 as shown in FIG. 1.

In various embodiments, pulse width detection module 320 includes a clock 330 coupled to a counter/comparator module 322. In various embodiments, counter/comparator module 322 includes a pulse count register 324, a counter presets register 326, and a comparator 328. In various embodiments, the operating frequency of clock 330 is set so that the clock 330 will provide a pre-determined number of clock cycles to counter/comparator module 322 over a time period that is the same time period set for a qualified pulse of light transmitted from the photo transmitter to which the receiver 300 is paired.

By way of illustration, if a qualified pulse of light transmitted by the transmitter to which receiver 300 is paired is intended to have a pulse width of 2 micro seconds, clock 330 is set to provide a pre-determined number of clock cycles during a 2 microsecond time period. By way of illustration, clock 330 is set to provide 50 clock cycles during a given 2 microsecond time period. In various embodiments, the pre-determined number of clock cycles that clock 330 will provided during a time period of a qualified pulse is stored as a value in one of the registers in counter preset 326.

In various embodiments, comparator 328 is coupled to both pulse counter 324 and the counter presets 326, and is operable to compare the number of clock pulses occurring during any given pulse representative of a light pulse received at photo detector 312 to the pre-determined number provided by counter presets 326. By comparing the number of clock cycles in any give pulse to the pre-determined number of clock cycles that should exist in a qualified light pulse, the comparator 328 is operable to provide an output signal at output 329 having a status indicative of whether the light pulse provided to the pulse width detection module 320 is a qualified light pulse or is a non-qualified light pulse.

In various embodiments, if the number of clock pulses counted by pulse counter 324 is the same as the predetermined number stored in counter presets 326 for a qualified light pulse, comparator 328 is operable to provide an output signal indicating that the light pulse is a qualified light pulse. If the number of clock pulses counted by pulse count 324 is not the same as the pre-determined value for a qualified light pulse as stored in counter presets 326, the pulse is determined to be a non-qualified pulse. In various embodiments, comparator 328 is operable to determine if the number of clock cycles counted by pulse counter 324 during a given light pulse is within a range of clock pulses based on the pre-determined value stored in counter presets 326.

By way of illustration, if counter presets 326 stores a value of 50 as a pre-determined value for the number of clock pulses in a qualified light pulse, comparator 328 is operable to determine that a given pulse of light included a time period having a number of clock pulses within a plus or minus range of pre-determined number of clock pulses based on the pre-determined value, for instance a range of plus or minus 10 percent, of the pre-determined number of clock pulses for a qualified light pulse. In various embodiments, if the number of clock pulses for a given signal representative of a light pulse is within the plus or minus range of the pre-determined values, the light pulse is determined to be a qualified pulse. In various embodiments, pulse width detection module is operable to provide an output signal indicative of the detection of a qualified pulse.

In various embodiments, pulse width detection module 320 is operable to determine that a particular time period has expired without a qualified pulse having been detected. In various embodiments, pulse width detection module 320 is operable to provide an output signal to indicate that the particular time period has expired without the detection of a qualified pulse.

In various embodiments, decision module 340 is operable to receive outputs from pulse width detection module 341, and to store values based on these received signals. In various embodiments, decision module 340 includes shift register 346, a latch 348 coupled to the shift register 346 the latch operable to allow output 350 to be latched to a state that indicates a stream of consecutive and qualified light pulses is being received from the transmitter to which the receiver is paired, and is operable to unlatch output 350 to a state indicative that a consecutively qualified stream of light pulses in not being received from the transmitter paired to the receiver 300.

By way of illustration, assuming the output 350 is not latched to indicate the reception of a stream of consecutive qualified light pulses, shift register 346 is operable to store a series of output values received from pulse width detection module 320. If the number of consecutively qualified pulses reaches a particular pre-determined value, decision module 340 is operable to use latch 348 to latch output 350 through output 343 to a status indicating that a stream of consecutively qualified light pulses is being received.

Once latch 348 has latched output 350, decision module 340 is operable to keep output 350 latched and to monitor the output from pulse width detection module 320 to determine if consecutive time periods have expired without the detection of a qualified pulse. Shift register 346 is operable to store values, and to increment the stored values based on outputs from pulse width detection module 320 related to the expiration of consecutive time periods without the detection of a qualified pulse. In various embodiments, the number of bits in shift register 346 is equal to the pre-determined value X as included in Equations 1-6.

In some embodiments, when all the values stored in shift register 346 are "1" the pre-determined value for the number of consecutively qualified pulses has been reached, and the outputs from shift register 346 are gated through logic gates to cause latch 348 to latch output 350. In various embodiments, when all the values stored in shift register 346 are "0" and the output 350 is latched, the predetermined number of consecutive time periods have expired without the detection of a qualified pulse having occurred. When the shift register 346 has all "0" values when the output is latched, the outputs of shift register 346 are gated through logic gates to cause latch 348 to unlatch output 350.

Thus, if the number of consecutive time periods expiring without the detection of a qualified pulse reaches a pre-determined value, decision module 340 is operable to reset latch 348 and cause the output 350 to assume a state indicating that a consecutively qualified stream of light pulses is no longer being received.

Figure 3B:
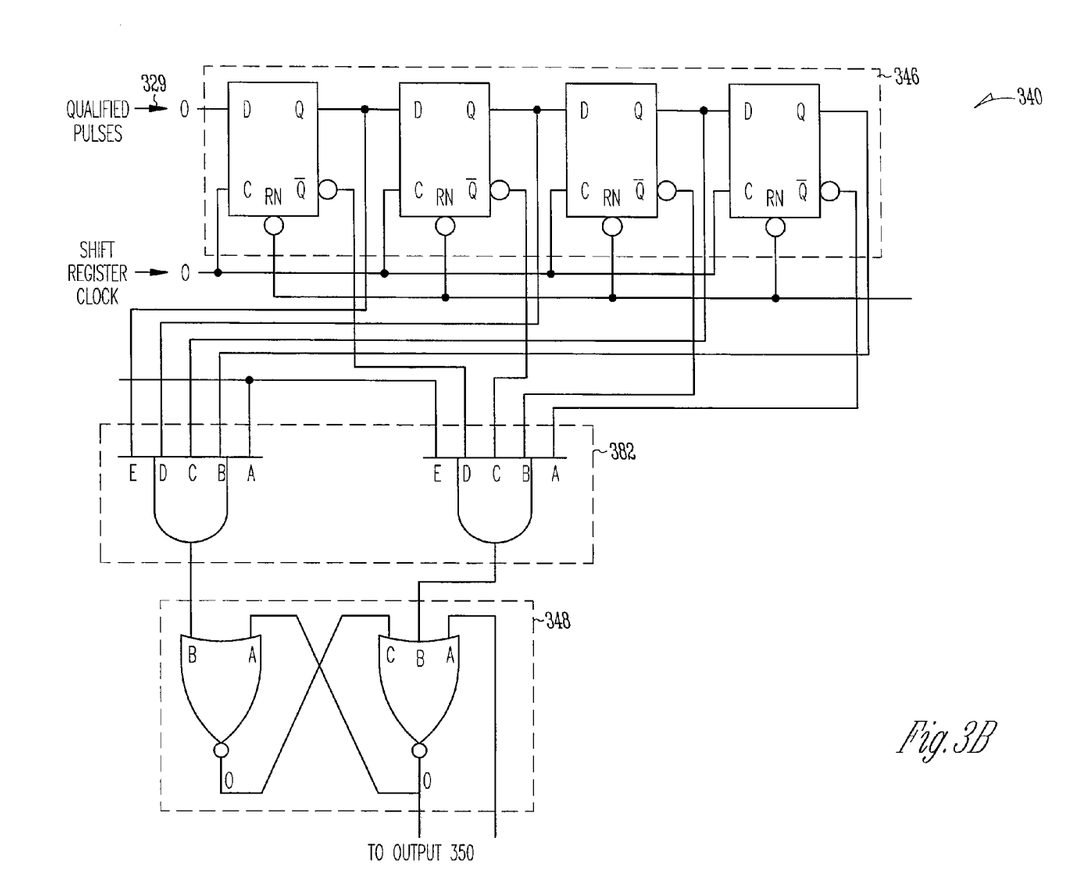
FIG. 3B illustrates a decision module according to various embodiments.

FIG. 3B illustrates a decision module 340 according to various embodiments. As shown in FIG. 3B, decision module 340 includes shift register 346 having four bits, each bit operable to store and to shift a value provided at input 329, wherein in some instances input 329 is coupled to a pulse width detection module. Each of the bits of shift register 346 include outputs coupled to logic gates 382. Logic gates 382 are operable to control latch 348 in order to latch output 350 when all of the bits in shift register 346 are a first value, such as all "1"s, and to unlatch output 350 when output 350 is latched and all the bits in shift register 346 are a second value, such as all "0"s.

In various embodiments, receiver 300 includes a processor 370 coupled to a memory 372. In various embodiments, processor 370 is operable to read data stored in memory 372, and to control the operation of any one or any combination of detector module 310, pulse width detection module 320, and decision module 340. In various embodiments, receiver 300 includes inputs 380, including one or ore input devices 381A-N. In various embroilments, input devices 382A-N are used to select data parameters, including clock frequencies for clock 330, pre-determined values for counter presents 326, and pre-determined values used by shift registers 346 to determine when to latch and when to unlatch output 350. In various embodiments, receiver 300 includes one or more indicators 316, including visual indicators 318A-N and display 319. Indicators 316 are not limited to any particular type of indicators, and are operable to display or to otherwise provide a visual indication of any type of status associated with the operations of receiver 300.

In various embodiments, receiver 300 includes a port 360 operable to allow recover 300 to input and output data. In various embodiments, port 360 is used to input data related to the known pulse widths and the known time periods for one or more sets of streams of light pulses that can be selectively transmitted by the transmitter paired to receiver 300. In various embodiments, receiver 300 includes a communication module 352 coupled to an antenna 355 operable allow receiver 300 to input and output data. In various embodiments, communication module 352 coupled to an antenna 355 are used to input data related to the known pulse widths and the known time periods for one or more sets of streams of light pulses that can be selectively transmitted by the transmitter paired to receiver 300. In various embodiments, this data is stored into memory 372. In various embodiments, a given one of input devices 382A-N is used to select the particular data representing a pulse width and a period for the stream of light that are to be transmitted from the transmitter paired with receiver 300 so that receiver 300 can be selectively set to one of a plurality of possible sets pulse widths and periods for qualified light pulses.

By matching the setting of receiver 300 to the transmitter to which receiver 300 is paired, and by setting the pulse width and periods of the other transmitter/receiver pairs to be a different set of pulse widths and periods related harmonically as described herein, receiver 300 and the transmitter paired with receiver 300 are a non-interfering transmitted beam pair that are not affected by errant light pulses represented by arrows 241 and 242 from the other transmitters in the pairs.

Figure 4:
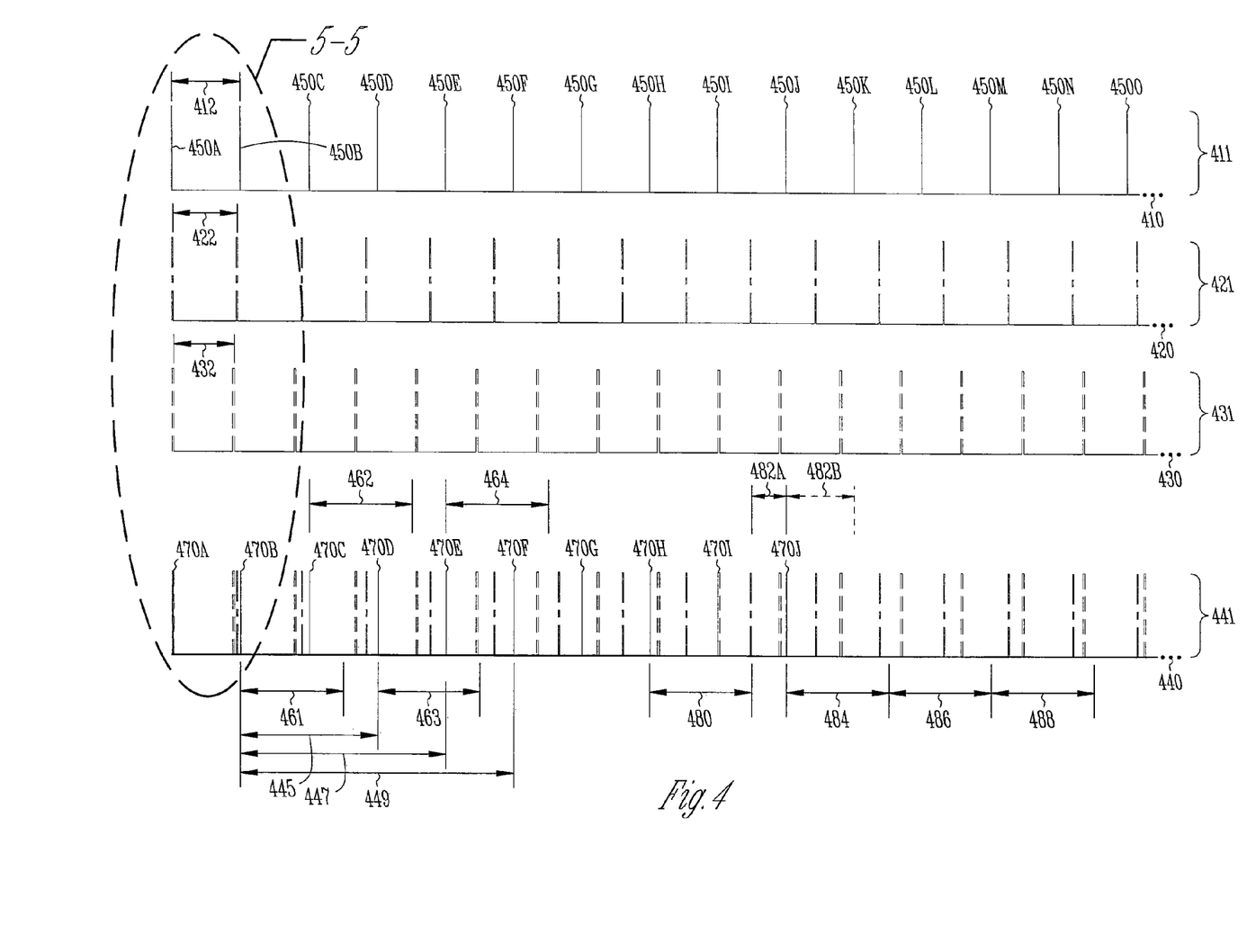
FIG. 4 illustrates graphs 400 representing streams of light pulses according to various embodiments.

FIG. 4 illustrates graphs 400 representing streams of light pulses according to various embodiments of the present subject matter. Graph 410 represents a series of pulses representing a stream of light pulses 411, labeled with reference numbers 450A-O, and representing a stream of pulses of light transmitted from a first photo transmitter (not shown in FIG. 4), and having a period 412 including both pulse and the time between the pulse and the start of the next consecutive pulse, along graph 410. In various embodiments, a time period equal to period 412 exists for each of the pulses and the time between the pulses for pulses 450B-O, as represented by graph 410. For illustration purposes, each of the pulses 450A-O are represented in graph 410 using as a set of solid vertical lines, which may appear in the FIG. 4 as a single vertical line due to the scaling of these sets of solid vertical lines.

Graph 420 represents a series of pulses representing a stream light pulses 421 transmitted from a second photo transmitter (not shown in FIG. 4), and having a period 422 including a both pulse and the time between the pulse and the start of the next consecutive pulse, along graph 420. In various embodiments, a time period equal to period 422 exists for each of the pulses and the period between the pulses as depicted in graph 420. For illustration purposes, each of the pulses in the stream of light pulses 421 is represented in graph 420 using a short dashed set of vertical lines.

Graph 430 represents a series of pulses representing a stream of light pulses 431 transmitted from a third photo transmitter (not shown in FIG. 4), and having a period 432 including a both pulse and the time between the pulse and the start of the next consecutive pulse, along graph 430. In various embodiments, a time period equal to period 432 exists for each of the pulses 431 and the time period between the pulses, as depicted in graph 430. For illustration purposes, each of the pulses in the stream of light pulses 431 is represented in graph 430 using a long dashed sets of vertical lines.

Figure 5:
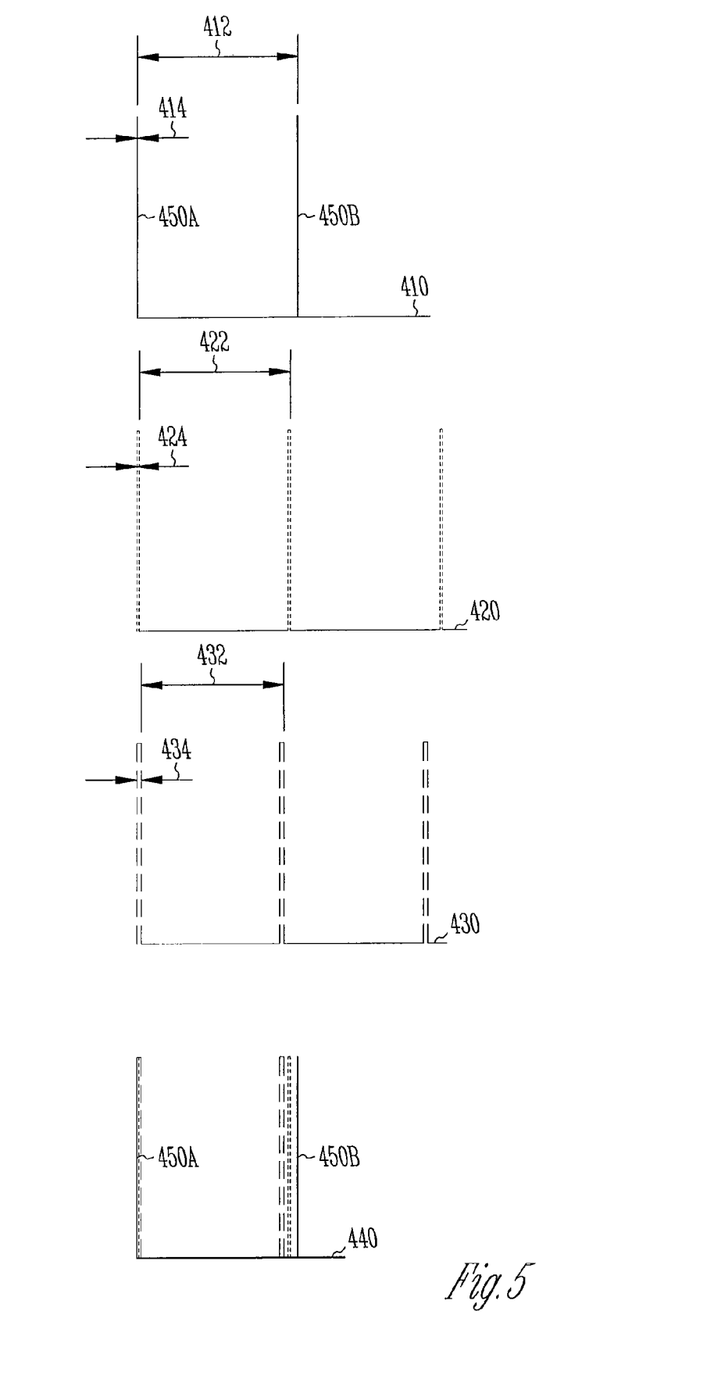
FIG. 5 illustrates a portion of each of the graphs included in FIG. 4, as indicated by the ellipse labeled as 5-5 in FIG. 4.

Referring to FIG. 5, in various embodiments, each of the pulses represented within a same given one of graphs 410, 420, and 430 has a same pulse width as all the pulses in the same given one of the graphs, and that is different from the pulse widths of each of the other pulses in the graphs other than the same one of graphs 410, 420, and 430. FIG. 5 includes a portion of each of graphs 410, 420, 430, and 440 as indicated by the ellipse labeled as 5-5 in FIG. 4. As shown in FIG. 5, pulse 450A, along with the other pulses in graph 410, have a pulse width 414. Pulses illustrated in graph 420 have a pulse width 424, and pulses illustrated in graph 430 have a pulse width 434. In various embodiment, each of pulse widths 414, 424, and 434 are different from each other, and each of the pulses within any given one of graphs 410, 420, and 430 have a same pulse width.

In various embodiments, a time period of pulse width 414 is 2 microseconds, a time period of pulse width 424 is 7.5 microseconds, and a time period of pulse width 434 is 14.5 microseconds. However, the particular values of the pulse widths 414, 424, and 434 are not limited to any particular values. In various embodiments, all that is required is that each of the pulse widths 414, 424, and 434 are different time values, and that adding the time periods for any two of the different pulse widths does not result in a time period that is equal to, or nearly equal to, the time period of the third pulse width.

By way of illustration, adding the value for the time period for pulse width 414, that is 2 microseconds, to the value of the time period for the pulse width 424, this is 7.5 microseconds, results in a value of 9.5 microseconds. The values of 9.5 microseconds is not equal to, and is not nearly equal to, the time period for the pulse width of 434, that is 14.2 microseconds. In various embodiments, not nearly equal to refers to when a value for the sum of two pulse widths is not within plus or minus 10 percent of the value of third pulse width.

Referring again to FIG. 4, graph 440 represents pluralities of streams of light pulses 441 including a stream of light pulses 470A-J corresponding to the pulses 450A-J represented in graph 410. Graph 440 includes all of the pulses of light from each of the streams of pulses of light represented graphs 410, 420, and 430 except for pulses 450K-O from graph 410. The pulses in graph 440 that would correspond to pulses 450K-O are deliberately missing from graph 440 to demonstrate various embodiments where the light pulses generated from the first transmitter providing the light pulses represented in graph 410 are block by an object between the transmitter and the receive, or for some other reason do not reach the receiver represented by graph 440, as further explained herein.

Each pulse on graph 440 is represented using the same line format (solid for graph 410, short dash for graph 420, and long dashes for graph 420) correspond to the particular stream generating the pulse. Each of the pulses on graph 440 represents pulses of light that could potentially be received at a given one receiver that is paired with one of the first, the second, or the third transmitters generating the streams of light pulses represented in graphs 410, 420, and 430.

For purposed of illustration, it will be assumed that the pulses of light pulses illustrated in graph 440 are being received at a photo receiver (not shown in FIG. 4) that is paired with the transmitter transmitting the stream of light pulses illustrated in graph 410. However, is would be understood that the similar illustration that using a receiver paired to any one of the transmitters generating the stream of light pulses illustrated in graphs 410, 420, and 430 could be made as described herein for the illustrative use of the first transmitter and graph 410.

Because the illustration of pulses in graph 440 is from a perspective of a receiver paired with the transmitter providing the stream of light pulses represented in graph 410, it would be understood for purposes of the illustration that the light pulses from graph 410 that arrive at the reviver, as depicted in graph 440 as pulses 470A-J, are the desirable and potentially qualifiable pulses, and that any other pulses received at the receiver, whether from graph 420 or graphs 430, are non-qualified or errant pulses. The pulses 470A-J are considered potentially qualifiable pulses because, as explained herein, these pulses can be corrupted through interference from other pulses not represented by the pulses in graph 410.

As shown in graph 440, at a time where pulse 470A occurs, the pulse width at the receiver would include light from pulses from graphs 420 and 430, and therefore would not be determined at the receiver as having the desired and distinct pulse width 414 of the pulses from the photo transmitter paired with the receiver. The combined pulses received at the time of pulse 470A would be determined to be a non-qualifying pulse because it includes a pulse width not equal to, or not nearly equal to, the desired and recognized pulse width 414.

At a time on graph 440 were pulse 470B occurs, the pulse width as measured for pulse 470B at the receiver would be determined to have the proper pulse width 414 for pulses being generated by the transmitter paired to the receiver, and thus would be determined to be a qualified pulse. This is true despite the pulses corresponding to pulses provided by the transmitters from graphs 420 and 430 just to the left hand-side of pulse 470B. These errant pulses would be rejected as non-qualifying pulses because they would be determined to have a pulse width not equal to, or not nearly equal to, the desired and know pulse width 414. Further, pulse 470B would be determined to have the desired and know pulse width 414, and because the pulse is not corrupted by any other light pulses, provides a qualifying pulse.

Assuming that the output of the receiver is not already latched into a state indicative that the stream of light pulses from the transmitter paired to the receiver is being received, the detection of a first qualified pulse will cause the receiver to clear a shift register, or in some embodiments a counter, and to shift data into the shift register, or increment the counter, to store a value indicating that one qualifying pulse has been detected.

Once a qualified pulse is detected, a timer having a time period 461 is initiated. The length of time period 461 is set to some time period greater than the time period 412 for the light pulses of graph 410. In various embodiments, the time period 461 is set to be 1.5 times the time period 412. At the end of time period 461, the timer expires. During time period 461, the receiver continues to look for at least one qualified light pulse. As shown in graph 440, the next two pulses to the right of pulse 470B are non-qualifying pulses generated by transmitters other then the transmitter paired with the receiver. However, pulse 470C arrives within time period 461, and is a qualified pulse. Pulse 470C represents a second consecutive qualified pulse received at the receiver.

The detection of a second qualified pulse will cause the receiver to shift data into the shift register, or embodiments using a counter, to increment the counter, in order to store a value indicating that two consecutive and qualifying pulse has been detected. The second pulse is considered to be "consecutive" because it was detected in a time period less than the time period for expiration of the timer having time period 461 and before time period 461 expired.

Upon receiving the second consecutive qualifying pulse 470C, another timer having a time period 462 is initiated, and the receiver again looks for a qualifying pulse during time period 462. Pulse 470D is a qualifying pulse received during time period 462, and thus represents the third consecutively received qualify pulse. Other pulses depicted on graph 440 during time period 462 are rejected by the receiver as non-qualified pulses due to the determined widths of these pulses. The pattern of receiving a qualified pulse, setting a timer, and looking for a next sequential qualified pulse during the time period while rejecting non-qualified pulses is repeated for pulse 470D during time period 463, and in various embodiments, for pulse 470E during time period 464.

Each time a consecutive and qualifying pulse is detected, the shift register or counter is incremented to indicate the detection of the additional consecutive and qualify pulse. In order to make a determination that the stream of light pulses from the transmitter paired to the receiver of graph 440 is being received, the value represented in the shift register, (or in embodiments using the counter the value in the counter) is compared to a pre-determined value for indicating that the stream of light pulses from the transmitter paired with the receiver is being received. If the stored value in the shift register (or the counter in embodiments, using the counter) reaches the pre-determined value, then a determination is made that the stream of light pulse from the transmitter paired with the receiver is being received.

By way of illustration, in various embodiments, after receiving pulse 470D and determining that pulse 470D is a qualified pulse, the receiver determines that three consecutive qualified pulses have been received, and that this number of consecutive qualified pulses is equal to the pre-determined number three of consecutive and qualify pulses needed to confirm reception of a stream of light pulses from the transmitter paired with the receiver. This is represented by bracket 445. In various embodiments, upon making the determination that the stream of consecutive and qualified light pulses have been received, the receiver will change a output so that that status of the output indicates that a stream of light pulses is being received from the transmitter paired with the receiver.

In another illustration, in various embodiments the pre-determined number of consecutive and qualified pulses that must be detected in order to determine that the stream of light pulses form the transmitter paired with the receiver is being received is four. In such embodiments, after receiving pulse 470E and determining that pulse 470E is a qualified pulse, the receiver determines that four consecutive qualified pulses have been received, and that this number of consecutive qualified pulses is equal to the pre-determined number four of consecutive and qualify pulses needed to confirm reception of a stream of light pulses from the transmitter paired with the receiver. This is represented by bracket 447.

In another illustration, in various embodiments the pre-determined number of consecutive and qualified pulses that must be detected in order to determine that the stream of light pulses form the transmitter paired with the receiver is being received is five. In such embodiments, after receiving pulse 470F and determining that pulse 470F is a qualified pulse, the receiver determines that five consecutive qualified pulses have been received, and that this number of consecutive qualified pulses is equal to the pre-determined number five of consecutive and qualify pulses needed to confirm reception of a stream of light pulses from the transmitter paired with the receiver. This is represented by bracket 449.

In instances where a qualified pulse is received and a timer is initiated, and then expires without receiving at least one addition qualified pulse before the time period of the timer expires, the receiver determines that no consecutive qualified pulse has been received. In such instances, the next received qualified pulse will be considered to be the first received qualified pulse, and the counting of the consecutively qualified pulse will be again started from the first received qualified pulse. Therefore, in order to determine that the proper number of qualified pulses has been received, at least the predetermined number of qualifying pulses must be received consecutively without any of the timers expiring and while having a least one qualified pulse occur during each of the time periods of the timers until the pre-determined number of consecutive and qualified pulses that must be detected in order to determine that the stream of light pulses from the transmitter paired with the receiver is being received has been detected Determining the output status associated with receiving a stream of consecutively qualified pulses is not limited to a particular number of consecutively qualified pulses, and four consecutively qualified pulses is merely illustrative. In various embodiments, the pre-determined number of consecutively qualified pulses needed to determine the a status of output of the receiver can be integer number greater than one. The larger the number, the more certain the determination is that that the desired stream of light pulses being received is from the transmitter paired to the receiver.

Once a determination has been made that a consecutive and qualified stream of light pulses is being received, the output status of the receiver is latched to the state indicative of receiving the consecutively qualified stream of light pulses. The receiver will continue to look for consecutive and qualified light pulses after the output status has been latched. However, a failure to detect for instance one next consecutive and qualified light pulse will not unlatch the output status of the receiver.

By way of illustration, pulse 470H represents a qualified pulse, and starts a timer having a time period 480. The next pulse received from the transmitter paired to the receiver is pulse 470I. However, pulse 470I is corrupted by a pulse from graph 430, and so is rejected as a non-qualify pulse. At the end of time period 480, no qualifying pulse has been detected, and so a shift register, or in some embodiments a counter, is reset and then shifted, or incrusted in the embodiments using a counter, to have a stored value of one, the value representative of a first non-qualified period during the time the output of the receiver is latched. In various embodiments, time period 480 has a length the same as time period 461-464, but embodiments are not limited to having these time periods having a same length of time.

At the time on graph 440 where pulse 470I occurs, the pulse width measured for pulse 470I will not be the proper pulse width 414 for a light pulse from the transmitter paired with the receiver due to interference from a pulse from graph 430. This single occurrence of a non-qualified pulse will not cause the status of provided at the output of the receiver to change from an indication that the stream of light pulses from the transmitter paired with the receiver are no longer being received because a pre-determined numbered of non-qualifying light pulses has not been equaled or exceeded.

By way of illustration, the pre-determined number of consecutive non-qualified pulses that need to be received before the output of the receiver is unlatched is four. Therefore, detecting a single non-qualifying pulse 470I will not cause the output status of the receiver to change. Only if the next three time periods used to look for qualified pulses fails to detect a qualified pulse in any of these next three time periods.

At the end of time period 480, another timer is started having time period 482. During time period 482, the receiver looks for another qualified pulse. If another qualified pulse is not detected during time period 482, the shift register, or the counter in embodiments using counter, will storing a value representing that two consecutive time periods have expired without the detection of a qualified, and a third time period would be initiated. However, as shown in graph 440, a qualified pulse 470J is detected within time period 482, and therefore the tracking and counting of non-qualified pulses is terminated, and will not be initiated again until a first non-qualified pulse is again detected by the receiver. If pulse 470J had not been detected, the time period would have continued as shown by time period 482B. At the time the first non-qualified pulse is again detected, the counter value will be cleared to zero and then incremented to have a value of one representing the count value for the next encountered non-qualified pulse.

This is illustrated by the set of time period 484, 486, and 488 in graph 440. As shown in graph 440, at the time pulse 470J is detected and determined to be a qualified pulse, the tracking of the consecutive non-qualified pulses begun at the expiration of time period 480 is terminated, and at timer having time period 484 is initiated at the time the pulse 470J is detected. Time period 484 in various embodiments, along with timer periods 486 and 488, is set to have length to be equal to the length of time periods 461-464, but embodiment of the present subject matter are not necessary limited to this timer period. During time period 482, a plurality of non-qualified light pulses are detected and rejected by the receiver. At the expiration of time period 484, no qualified light pulses have been received, and so a shift register or a counter is cleared and set to store a value indicative that a first time period has expired without receiving a qualified light pulse while the output of the receiver is latched.

At the expiration of time period 484, another timer is initiated have a time period 486. As with time period 484, during time period 486 several non-qualified light pulses are received and rejected by the receiver, and at the expiration of time period 486, no qualified light pulses have been detected. As a result, the shift register or counter storing the value representing the number of consecutive time periods expiring without a qualified pulse being detected is adjusted to represent a value of two.

At the expiration of time period 486, another timer is initiated have a time period 488. As with time period 486, during time period 488 several non-qualified light pulses were received and rejected by the receiver, and at the expiration of time period 488, no qualified light pulses were detected. As a result, the shift register or counter storing the value representing the number of consecutive time periods expiring without a qualified pulse being detected is adjusted to represent a value of three.

For purposes of illustration, assuming that the pre-determined value for determining that a stream of light pulses is not being received from the transmitter paired to the receiver while the receiver output is latched is three, the value represented in the shift register, or counter has reached this pre-determined value, and a determination is made by the receiver that the stream of light pulses is no longer being received from the transmitter paired to the receiver.

It would be understood that the pre-determined value for making this determination is not limited to any particular value, and that the cycle of setting timers and determining if a qualified pulse is detected before the end of the time period can be repeated until ether the number of consecutive time periods that expire without the detection of a qualified pulses reached the pre-determined value, or in the alternative a qualified pulse is detected before the pre-determined value is reached, in which case the counting of the number of expired timer periods is terming as was illustrated by the description related to the sequence for pulses 470I and 470J.

In various embodiments, this can be due to the fact that the transmitter is still transmitting the stream of light pulses, but the stream of light pulses is being block from reaching the receiver by an object, the presence of which the transmitter and receiver pair is intended to detect. In various embodiments, when a determination is made that the stream of consecutive non-qualified pulses has reached the pre-determined number for consecutive non-qualified pulses, the receiver unlatches the receiver's output and changes the status of the output to a status that indicates that the stream of light pulses from the transmitter paired with the receiver is not being received at the receiver.

At the time on graph 440 where pulse 470I occurs, the pulse width measured for pulse 470I will not be the proper pulse width 414 for a light pulse from the transmitter paired with the receiver due to interference from a pulse from graph 430. This single occurrence of a non-qualified pulse will not cause the status of provided at the output of the receiver to change from an indication that the stream of light pulses from the transmitter paired with the receiver are no longer being received because a pre-determined numbered of non-qualifying light pulses has not been equaled or exceeded. By way of illustration, the pre-determined number of consecutive non-qualified pulses that need to be received before the output of the receiver is unlatched is four. Therefore, detecting a single non-qualifying pulse 470I will not cause the output status of the receiver to change. Only if the next three time periods used to look for qualified pulses fails to detect a qualified pulse in any of these next three time periods.

By using a pre-determined number to compare to the number of consecutively qualified pulses to determine when to latch the status of the receiver output to a state indicative of receiving the stream of light pulses d from the transmitter paired with the receiver, and using a pre-determined number to compare to the number of time periods that have expired consecutively without having received a qualified pulse once the output is latched to determine when to un-latch the output, the receiver is operable to properly provide an output indicative of whether a stream of light pulses is being received from the transmitter paired with the receiver despite the receiver also receiving light pulses from one or more other transmitters other than the transmitter paired to the receiver.

Figure 6:
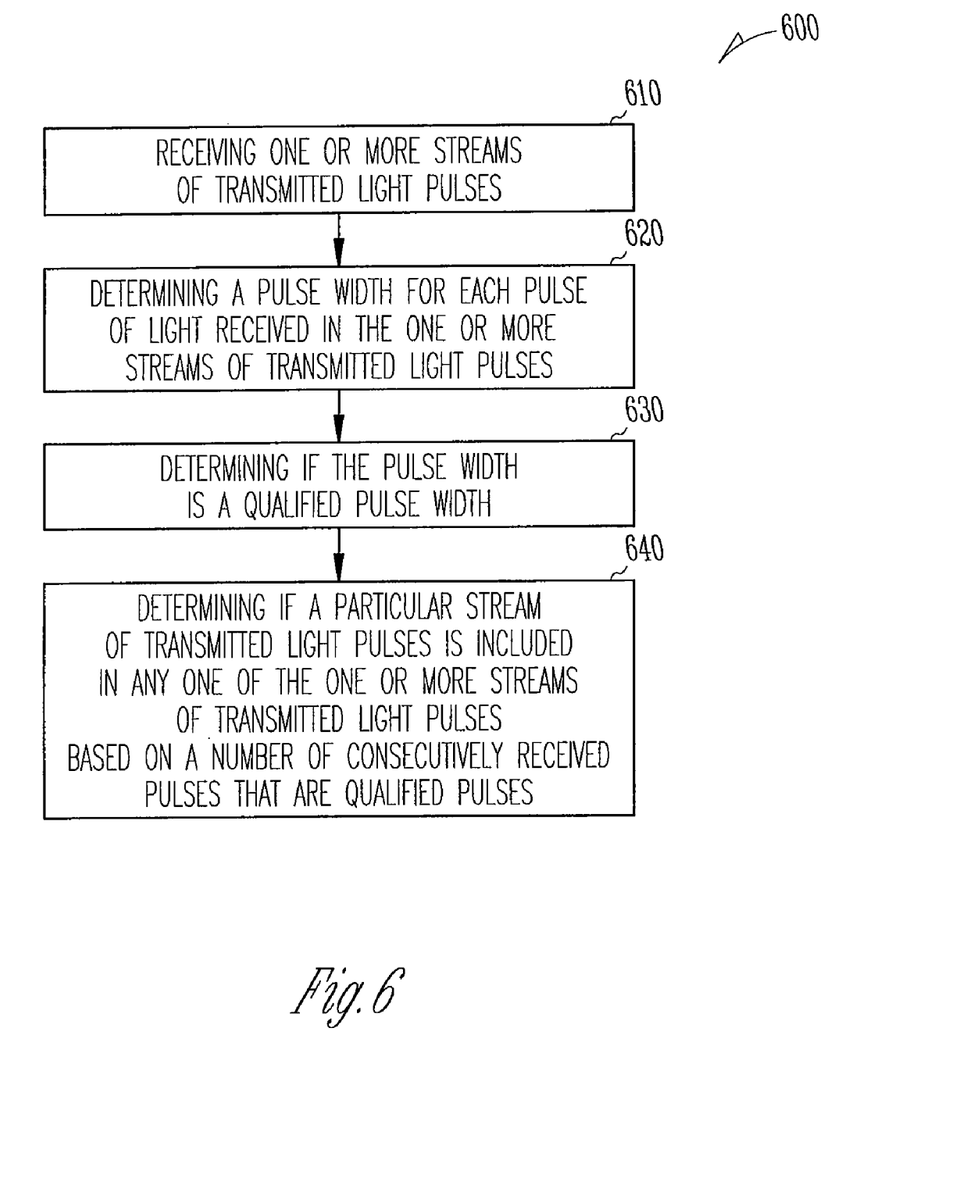
FIG. 6 illustrates a flowchart of one or more methods 600 according to various embodiments of the present inventive subject matter.

FIG. 6 illustrates a flowchart of one or more methods 600 according to various embodiments of the present inventive subject matter.

At block 610, method 600 includes receiving one or more streams of transmitted light pulses.

At block 620, method 600 includes determining a pulse width for each pulse of light received in the one or more streams of transmitted light pulses;

At block 630, method 600 determining if the pulse width is a qualified pulse width.

At block 640, method 600 includes determining if a particular stream of transmitted light pulses is included in any one of the one or more streams of transmitted light pulses based on a number of consecutively received pulses that are qualified pulses.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments, and other embodiments, will be apparent to those of skill in the art upon studying the above description.

What is claimed is:

1. An apparatus comprising:
    a photo receiver operable to detect a stream of light pulses transmitted from a photo transmitter paired with the photo receiver, wherein a frequency of the stream of light pulses has a harmonic relationship with a frequency of at least one other stream of light pulses transmitted by a photo transmitter not paired to the photo receiver;
    wherein the stream of light pulses from the transmitter paired with the photo receiver has a pulse width that is different from a pulse width of the at least one other stream of light pulses transmitted by the photo transmitter not paired to the photo receiver, and the stream of light pulses is detectable by the photo receiver even when the photo receiver is receiving one or more light pulses from the at least one other stream of light pulses, and
    wherein the photo receiver and the photo transmitted that is paired with the photo receiver are not connected by a synchronizing interconnect between the photo transmitter and the photo receiver, and no synchronization is required between the photo receiver and the photo transmitter that is paired with the photo receiver.

2. The apparatus of claim 1, wherein the photo receiver includes:
    a photo receiver portion operable to receive one or more transmitted streams of light pulses, wherein each of the one or more transmitted streams of light pulses are transmitted from a particular one of a plurality of photo transmitters;
    a pulse width detection module coupled to the photo receiver portion and operable to determine a width for each of a plurality of pulses of light received at the photo receiver portion in the one or more transmitted streams of light pulses, and to provide an output representative of width for each of the plurality of pulses of light received at the photo receiver portion; and
    a decision module coupled to the pulse width detection module, the decision module operable to receive the output from the pulse width detection module and to determine if any of the streams of light pulses received at the photo receive portion are a transmitted stream of light pulses transmitted from a given one of the plurality of photo transmitters that has been paired with the receiver.

3. The apparatus of claim 2, wherein the decision module includes a decision circuit operable to receive an output from the pulse width detection module having a value corresponding to pulse width of a width for a given one of the plurality of pulses of light received at the photo receiver portion, and to determine if the value represents a value for a qualified pulse width.

4. The apparatus of claim 2, wherein the decision module includes a shift register operable to store a plurality of status values associated with a plurality of widths for consecutively received light pulses.

5. The apparatus of claim 2, and wherein for any qualified pulse received at the decision module, a value corresponding to a receipt of a qualified pulse width is shifted into a shift register.

6. The apparatus of claim 2, wherein the decision module includes a latch operable to latch an output from the decision module at a first state when a first number of qualified and sequential pulses are received at the photo receiver, and to latch the output from the decision module to a second state when a second number of non-qualified and sequential pulses that do not include a qualified pulse are received at the photo receiver.

7. The apparatus of claim 1, wherein the photo receiver is operable to detect light pulses having a wavelength within the range of wavelengths associated with visible light.

8. The apparatus of claim 1, wherein the photo receiver is operable to detect light pulses having a wavelength within the range wavelengths associated with infrared light.

9. An apparatus comprising:
a photo receiver operable to detect a stream of light pulses transmitted from a photo transmitter paired with the photo receiver, wherein a frequency of the stream of light pulses has a harmonic relationship with a frequency of at least one other stream of light pulses transmitted by a photo transmitter not paired to the photo receiver;
wherein the stream of light pulses from the transmitter paired with the photo receiver is detectable by the photo receiver even when the photo receiver is receiving one or more light pulses from the at least one other stream of light pulses;
wherein the harmonic relationship for the frequency of the stream of light from the transmitter paired with the photo receiver and the frequency of the at least one other stream of light pulses transmitted by the photo transmitter not paired to the photo receiver conform to both of the following equations:

$$f_{clock}A/|(f_{clock}A-f_{clock}B)|>X \quad \text{[Equation 1]}$$

and $$f_{clock}B/|(f_{clock}B-f_{clock}A)|>X \quad \text{[Equation 2]}$$

wherein $f_{clock}A$ is the frequency of the streams of light pulses provided by the transmitter paired with the photo receiver, $f_{clock}B$ is the frequency of the streams of light pulses provided by a transmitter not paired to the photo receiver, and X is a number of bits in a shift register included in the photo receiver that determines a pre-determined value including any integer values greater than 1.

10. A method comprising:
receiving one or more streams of transmitted light pulses, wherein each of the one or more streams of transmitted light pulses has a harmonic relationship with each of the other one or more streams of transmitted light pulses and has a pulse width that is different from a pulse width of each of the other one or more streams of transmitted light pulses, and wherein there is no synchronization signal included in or between any of the one or more streams of transmitted light pulses;
determining a pulse width for each pulse of light received in the one or more streams of transmitted light pulses;
determining if the pulse width is a qualified pulse width;
determining if a particular stream of transmitted light pulses is included in any one of the one or more streams of transmitted light pulses based on a number of consecutively received pulses that are qualified pulses.

11. The method of claim 10, wherein determining if a particular stream of transmitted light pulses is included in any one of the one or more streams of transmitted light pulses includes determining that a plurality of light pulses included in the particular stream of transmitted light pulses have pulse width that is the same as a pre-determined pulse width for the particular stream of transmitted light pulses.

12. The method of claim 10, wherein receiving one or more streams of transmitted light pulses includes receiving one or more stream of transmitted light each having a wavelength within the range of wavelengths associated with visible light.

13. The method of claim 10, wherein receiving one or more streams of transmitted light pulses includes receiving one or more stream of transmitted light each having a wavelength within the range wavelengths associated with infrared light.

14. The method of claim 10, wherein determining if a particular stream of transmitted light pulses in any one of the one or more streams of transmitted light pulses includes determining if a stream of light pulses has pulses conforming to a known pulse width and having a known period.

15. The method of claim 10, wherein determining for each pulse width if the pulse width is a qualified pulse width includes:
designating a count value corresponding to qualified pulse width;
determining a count value for each pulse width; and
comparing the determined count value for the pulse width to the designated count value corresponding to a qualified pulse width, and if the determined count values of the pulse width is equal to the designated value corresponding to a qualified pulse width, designating the pulse as a qualified pulse.

16. A method comprising:
receiving one or more streams of transmitted light pulses, wherein each of the one or more streams of transmitted light pulses has a harmonic relationship with each of the other one or more streams of transmitted light pulses;
determining a pulse width for each pulse of light received in the one or more streams of transmitted light pulses;
determining if the pulse width is a qualified pulse width;
determining if a particular stream of transmitted light pulses is included in any one of the one or more streams of transmitted light pulses based on a number of consecutively received pulses that are qualified pulses;
wherein the harmonic relationship between any two of the frequencies of the one or more streams of transmitted light pulses conform to both of the following equations:

$$f_{clock}A/|(f_{clock}A-f_{clock}B)|>X \quad \text{[Equation 1]}$$

and $$f_{clock}B/|(f_{clock}B-f_{clock}A)|>X \quad \text{[Equation 2]}$$

wherein $f_{clock}A$ is a first frequency of the streams of light pulses for a first one of the any two frequencies, $f_{clock}B$ is second frequency of the streams of light pulses for a second one of the any two frequencies, and X is a number of bits in a shift register included in the photo receiver that determines a pre-determined value including any integer values greater than 1.

17. A system comprising:
a plurality of photoelectric sensors, each of the plurality of photoelectric sensors, including a non-interfering transmitted beam pair including a transmitter and a receiver;
wherein each of the transmitted beam pairs is operable to transmits a stream of light pulses having a pulse width that is different from any pulse width of any other transmitted beam pair and each transmitted stream of light pulses having a harmonic relationship to every other transmitted stream of light pulses,
wherein the transmitter and the receiver within a given transmitted beam pair is not connected by a synchronizing interconnect between the transmitter and the receiver and
and wherein each of the transmitted beam pairs is operable to determine if a stream of light pulses received at the receiver of the transmitted beam pair includes a light stream of light pulses being transmitted from the corresponding transmitter paired with the receiver.

18. The system of claim 17, wherein the harmonic relationship between any two of the frequencies of the one or more streams of transmitted light pulses conform to both of the following equations:

$$f_{clock}A/|(f_{clock}A - f_{clock}B)| > X \qquad \text{[Equation 1]}$$

and $$f_{clock}B/|(f_{clock}B - f_{clock}A)| > X \qquad \text{[Equation 2]}$$

wherein $f_{clock}A$ is a first frequency of the streams of light pulses for a first one of the any two frequencies, $f_{clock}B$ is second frequency of the streams of light pulses for a second one of the any two frequencies, and X is a number of bits in a shift register that determines a pre-determined value including any integer values greater than 1.

19. A system comprising:
a first photo receiver paired with a first photo transmitter, the first photo transmitter operable to transmit pulses of light having a first frequency and including pulses having a first width;
a second photo receiver paired with a second transmitter, the second transmitter operable to transmit pulses of light having a second frequency and including pulses having a second width;
a third photo receiver paired with a third transmitter, the third transmitter operable to transmit pulses of light having a third frequency and including pulses having a third width;
wherein the first, second and third frequency are each different frequencies from one and other, and the first, second, and third widths are different widths from one and other;
wherein each of the first frequency, the second frequency, and the third frequency are harmonically related to each other,
and wherein each of the first photo receiver, the second photo receiver, and the third photo receiver include a decision module, each of the decision modules coupled with a particular one of the first photo receiver, the second photo receiver, or the third photo receiver, and operable to determine that a stream of light pulses received at a particular one of the photo receives that the particular one of the decision modules is coupled with was transmitted from a particular one of the first transmitter, the second transmitter, or the third transmitter module that is paired with the particular one of the photo receivers, and without having a synchronization interconnect between the particular one of the photo receivers and the particular one of the photo transmitters that is paired with the particular one of the photo receivers.

20. The system of claim 19, wherein
the pulses of light transmitted from the first photo transmitter have a pulse width of 2 microseconds and a period of 512 microseconds;
the pulses of light transmitted from the second photo transmitter have a pulse width of 7.5 microseconds and a period of 482 microseconds; and
the pulses of light transmitted from the third photo transmitter have a pulse width of 14.2 microseconds and a period of 455 microseconds.

21. The system of claim 19 wherein at least one of the first, the second, and the third photo receivers includes a decision modules including a four bit shift register coupled to a latch circuit, the latch circuit operate to latch and unlatch an output of the first, second, or third photo receiver where the shift register and latch are located.

22. A system comprising:
a first photo receiver paired with a first photo transmitter, the first photo transmitter operable to transmit pulses of light having a first frequency and including pulses having a first width;
a second photo receiver paired with a second transmitter, the second transmitter operable to transmit pulses of light having a second frequency and including pulses having a second width;
a third photo receiver paired with a third transmitter, the third transmitter operable to transmit pulses of light having a third frequency and including pulses having a third width;
wherein the first, second and third frequency are each different frequencies from one and other, and the first, second, and third widths are different widths from one and other;
wherein each of the first frequency, the second frequency, and the third frequency are harmonically related to each other;
wherein the harmonic relationship between any two of the first frequencies the second frequency, and the third frequency conform to both of the following equations:

$$f_{clock}A/|(f_{clock}A - f_{clock}B)| > X \qquad \text{[Equation 1]}$$

and $$f_{clock}B/|(f_{clock}B - f_{clock}A)| > X \qquad \text{[Equation 2]}$$

wherein $f_{clock}A$ is a first frequency of the streams of light pulses for a first one of the any two frequencies, $f_{clock}B$ is second frequency of the streams of light pulses for a second one of the any two frequencies, and X is a number of bits in a shift register included in the photo receiver that determines a pre-determined value including any integer values greater than 1.

* * * * *